US012646415B2

(12) United States Patent
Chalaki et al.

(10) Patent No.: US 12,646,415 B2
(45) Date of Patent: Jun. 2, 2026

(54) SYSTEMS AND METHODS FOR SWARM ADAPTATION BASED ON SOCIAL VALUE ORIENTATIONS

(71) Applicant: Honda Motor Co., Ltd., Tokyo (JP)

(72) Inventors: Behdad Chalaki, Ann Arbor, MI (US); Vaishnav Tadiparthi, Ann Arbor, MI (US); Hossein Nourkhiz Mahjoub, Ann Arbor, MI (US); Ehsan Moradi Pari, Ann Arbor, MI (US); Jovin Jeevan D'Sa, Ann Arbor, MI (US)

(73) Assignee: Honda Motor Co., Ltd., Tokyo (JP)

( * ) Notice: Subject to any disclaimer, the term of this patent is extended or adjusted under 35 U.S.C. 154(b) by 297 days.

(21) Appl. No.: 18/477,897

(22) Filed: Sep. 29, 2023

(65) Prior Publication Data

US 2025/0111784 A1     Apr. 3, 2025

(51) Int. Cl.
*G08G 1/00*          (2006.01)
*B60W 30/165*     (2020.01)
(Continued)

(52) U.S. Cl.
CPC ............. *G08G 1/22* (2013.01); *B60W 30/165* (2013.01); *G05D 1/0293* (2013.01); *G06N 3/092* (2023.01);
(Continued)

(58) Field of Classification Search
CPC .................. G08G 1/22; B60W 30/165; B60W 2554/4041; B60W 2554/4044;
(Continued)

(56) References Cited

U.S. PATENT DOCUMENTS

| | | |
|---|---|---|
| 9,884,625 B2 | 2/2018 | Taira et al. |
| 10,860,025 B2 | 12/2020 | Cunningham |

(Continued)

FOREIGN PATENT DOCUMENTS

| | | |
|---|---|---|
| CN | 106991846 B | 4/2020 |
| CN | 111845754 B | 9/2021 |

(Continued)

OTHER PUBLICATIONS

Gergely Hollósi, Csaba Lukovszki, Máte Bancsics, and Gabor Magyar. "Traffic Swarm Behaviour: Machine Learning and Game Theory in Behaviour Analysis," Infocommunications journal. 13. 19-27. (Jan. 2021) DOI: 10.36244/ICJ.2021.4.3.

(Continued)

*Primary Examiner* — Andrew R Dyer
(74) *Attorney, Agent, or Firm* — Rankin, Hill & Clark LLP

(57)          ABSTRACT

Systems and methods for swarm adaptation based on social value orientations are provided. In one embodiment, a method includes calculating social value orientations for a proximate vehicle of a plurality of proximate vehicles on a roadway with a plurality of swarm vehicles of a swarm. The method includes determining a total cost for the one or more proximate vehicles based on the social value orientations. The total cost for the proximate vehicle is based on an individual cost of the proximate vehicle and a joint cost of the proximate vehicle relative to the roadway vehicles. The method includes generating a global objective function based on a summation of the total cost of the plurality of proximate vehicles. The method includes determining a swarm action for a swarm vehicle by minimizing the total cost of the global objective function. The method includes causing the swarm vehicle to execute the swarm action.

18 Claims, 6 Drawing Sheets

400 —

402 — Calculate social value orientations for one or more proximate vehicles on a roadway with a plurality of swarm vehicles of a swarm 404 — Determine a total cost for the one or more proximate vehicles based on the social value orientations 406 — Generate a global objective function based on a summation of the total cost of the plurality of proximate vehicles 408 — Determine a swarm action for a swarm vehicle of the swarm by minimizing the total cost of the global objective function 410 — Cause the swarm vehicle to execute the swarm action

(51) Int. Cl.
  *G05D 1/00* (2006.01)
  *G06N 3/092* (2023.01)

(52) U.S. Cl.
  CPC ............... *B60W 2554/4041* (2020.02); *B60W 2554/4044* (2020.02); *B60W 2554/4046* (2020.02); *B60W 2554/80* (2020.02)

(58) Field of Classification Search
  CPC ...... B60W 2554/4046; B60W 2554/80; G05D 1/0293; G06N 3/092; G06N 3/006
  USPC ......................................................... 701/711
  See application file for complete search history.

(56) References Cited

U.S. PATENT DOCUMENTS

| | | | |
|---|---|---|---|
| 10,902,726 | B2 | 1/2021 | Alvarez et al. |
| 11,077,850 | B2 | 8/2021 | Green et al. |
| 11,221,229 | B1 | 1/2022 | Mclean |
| 11,313,693 | B2 | 4/2022 | MacDonald et al. |
| 11,407,415 | B2 | 8/2022 | Austin et al. |
| 11,462,111 | B2 | 10/2022 | Vassilovski et al. |
| 2014/0129075 | A1 | 5/2014 | Carleton |
| 2018/0089553 | A1* | 3/2018 | Liu .......................... G06N 3/006 |
| 2019/0329778 | A1 | 10/2019 | D'sa et al. |
| 2019/0373419 | A1 | 12/2019 | Bayley et al. |
| 2020/0175880 | A1 | 6/2020 | Ibrahim et al. |
| 2020/0312155 | A1 | 10/2020 | Kelkar et al. |
| 2020/0322272 | A1* | 10/2020 | Jang ........................ G06N 3/092 |
| 2021/0056852 | A1 | 2/2021 | Lund et al. |
| 2021/0086784 | A1 | 3/2021 | Stewart et al. |
| 2021/0146964 | A1 | 5/2021 | Rus et al. |
| 2022/0144309 | A1* | 5/2022 | Hwu ......................... G06N 3/04 |
| 2022/0386094 | A1 | 12/2022 | Vemuri et al. |
| 2023/0010974 | A1 | 1/2023 | Cho |
| 2023/0063040 | A1* | 3/2023 | Korpi .................... H04W 24/02 |
| 2023/0101576 | A1 | 3/2023 | Kumar et al. |
| 2023/0182764 | A1 | 6/2023 | Fukui et al. |
| 2023/0188508 | A1 | 6/2023 | Stählin et al. |
| 2025/0078662 | A1 | 3/2025 | Ansari et al. |

FOREIGN PATENT DOCUMENTS

| | | |
|---|---|---|
| CN | 113788029 A | 12/2021 |
| JP | 6570507 B2 | 9/2019 |
| JP | 6865979 B2 | 4/2021 |
| WO | WO2022030372 A1 | 2/2022 |

OTHER PUBLICATIONS

Wilko Schwarting, Alyssa Pierson, Javier Alonso-Mora, Sertac Karaman, and Daniela Rus. Social behavior for autonomous vehicles. Proceedings of the National Academy of Sciences, 116(50):24972-24978, 2019.

Wim BG Liebrand and Charles G McClintock. The ring measure of social values: A computerized procedure for assessing individual differences in information processing and social value orientation. European journal of personality, 2(3):217-230, 1988.

Office Action of U.S. Appl. No. 18/477,880 dated May 14, 2025, 30 pages.

Notice of Allowance of U.S. Appl. No. 18/477,880 dated Aug. 14, 2025, 14 pages.

* cited by examiner

400

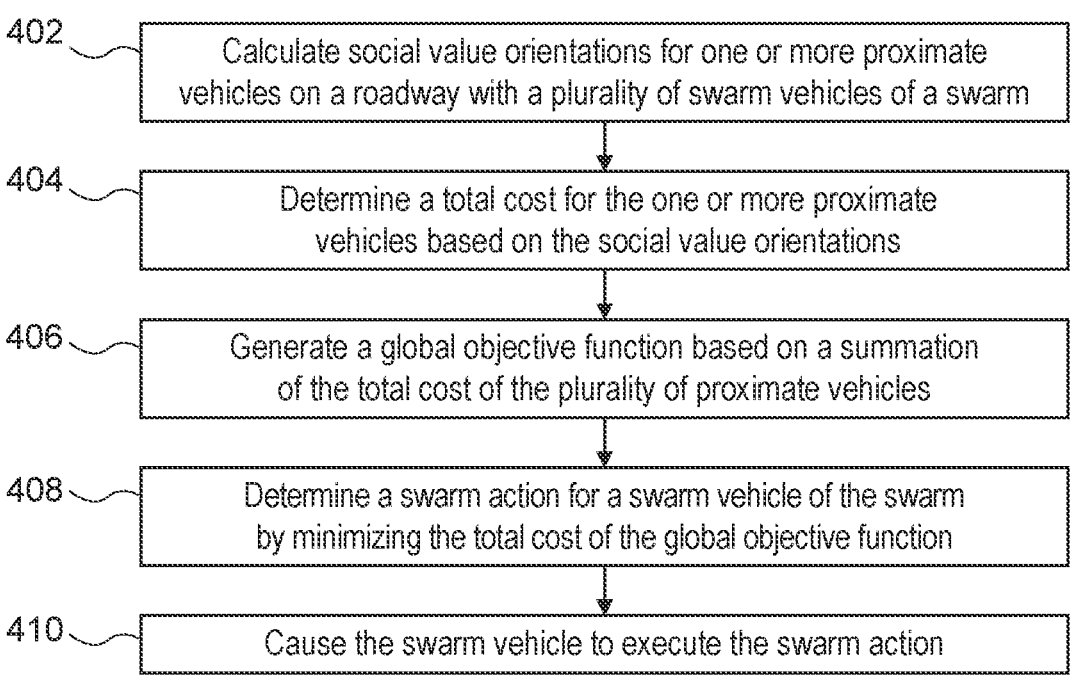

402 — Calculate social value orientations for one or more proximate vehicles on a roadway with a plurality of swarm vehicles of a swarm 404 — Determine a total cost for the one or more proximate vehicles based on the social value orientations 406 — Generate a global objective function based on a summation of the total cost of the plurality of proximate vehicles 408 — Determine a swarm action for a swarm vehicle of the swarm by minimizing the total cost of the global objective function 410 — Cause the swarm vehicle to execute the swarm action

FIG. 4

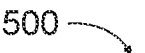

500

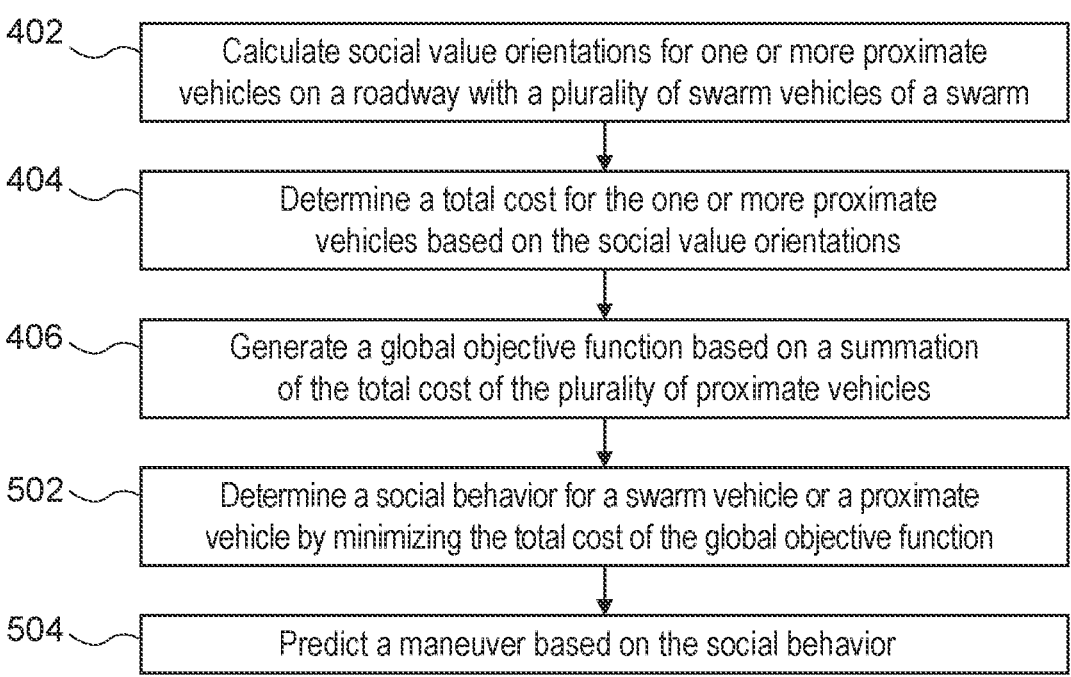

402 — Calculate social value orientations for one or more proximate vehicles on a roadway with a plurality of swarm vehicles of a swarm 404 — Determine a total cost for the one or more proximate vehicles based on the social value orientations 406 — Generate a global objective function based on a summation of the total cost of the plurality of proximate vehicles 502 — Determine a social behavior for a swarm vehicle or a proximate vehicle by minimizing the total cost of the global objective function 504 — Predict a maneuver based on the social behavior

COMPUTER
INSTRUCTIONS

606

01011010001010
10101011010101
101101011100...

608

COMPUTER READABLE
MEDIUM

1

SYSTEMS AND METHODS FOR SWARM ADAPTATION BASED ON SOCIAL VALUE ORIENTATIONS

RELATED APPLICATIONS

This application is related to U.S. Non-Provisional Application entitled SYSTEMS AND METHODS FOR SWARM INVITATION BASED ON SOCIAL VALUES, U.S. patent application Ser. No. 18/477,880, filed concurrently herewith, which is expressly incorporated by reference.

BACKGROUND

Interacting with human drivers is one of the great challenges of autonomous driving. To operate in the real world, autonomous vehicles need to cope with situations requiring complex observations and interactions, such as highway merging and unprotected left-hand turns, which are challenging even for human drivers. To add to this challenge, vehicles may act on a behavior spectrum from altruistic behavior to egotistical behavior. Altruistic driving may create bottlenecks in traffic flow, especially in intersections, for example, when an altruistic vehicle allows other vehicles to go through the intersection. Likewise, egotistical behavior by an autonomous vehicle, in which the autonomous vehicle does not consider the actions of other vehicles on the roadway, may make it difficult for human drivers to anticipate the autonomous vehicle.

BRIEF DESCRIPTION

In one embodiment, a system for swarm adaptation based on social value orientations is provided. The system may include a processor and a memory storing instructions. When executed by the processor, the instructions cause the processor to calculate social value orientations for one or more proximate vehicles of a plurality of proximate vehicles on a roadway with a plurality of swarm vehicles of a swarm on the roadway. The one or more proximate vehicles of the plurality of proximate vehicles and the swarm vehicles of the swarm are roadway vehicles traveling in the same longitudinal direction on the roadway. A social value orientation of a proximate vehicle of the plurality of proximate vehicles is based a velocity disruption value of the proximate vehicle and a position disruption value of the proximate vehicle. The instructions also cause the processor to determine a total cost for the one or more proximate vehicles based on the social value orientations. The total cost for the proximate vehicle of the plurality of proximate vehicles is based on an individual cost of the proximate vehicle and a joint cost of the proximate vehicle relative to the roadway vehicles. The instructions further cause the processor to generate a global objective function based on a summation of the total cost of the plurality of proximate vehicles. The instructions yet further cause the processor to determine a swarm action for a swarm vehicle of the swarm by minimizing the total cost of the global objective function. The instructions yet further cause the processor to cause the swarm vehicle to execute the swarm action.

According to another aspect, a computer-implemented method for swarm adaptation based on social value orientations is provided. The computer-implemented method includes calculating social value orientations for one or more proximate vehicles of a plurality of proximate vehicles on a roadway with a plurality of swarm vehicles of a swarm on the roadway. The one or more proximate vehicles of the plurality of proximate vehicles and the swarm vehicles of the swarm are roadway vehicles traveling in the same longitudinal direction on the roadway. A social value orientation of a proximate vehicle of the plurality of proximate vehicles is based a velocity disruption value of the proximate vehicle and a position disruption value of the proximate vehicle. The computer-implemented method also includes determining a total cost for the one or more proximate vehicles based on the social value orientations. The total cost for the proximate vehicle of the plurality of proximate vehicles is based on an individual cost of the proximate vehicle and a joint cost of the proximate vehicle relative to the roadway vehicles. The computer-implemented method further includes generating a global objective function based on a summation of the total cost of the plurality of proximate vehicles. The computer-implemented method yet further includes determining a swarm action for a swarm vehicle of the swarm by minimizing the total cost of the global objective function. The computer-implemented method includes causing the swarm vehicle to execute the swarm action.

According to yet another aspect, a non-transitory computer readable storage medium for executing a method for swarm adaptation based on social value orientations is provided. The non-transitory computer readable storage medium may store instructions that when executed by a computer having a processor performs a method. The method includes calculating social value orientations for one or more proximate vehicles of a plurality of proximate vehicles on a roadway with a plurality of swarm vehicles of a swarm on the roadway. The one or more proximate vehicles of the plurality of proximate vehicles and the swarm vehicles of the swarm are roadway vehicles traveling in the same longitudinal direction on the roadway. A social value orientation of a proximate vehicle of the plurality of proximate vehicles is based a velocity disruption value of the proximate vehicle and a position disruption value of the proximate vehicle. The method also includes determining a total cost for the one or more proximate vehicles based on the social value orientations. The total cost for the proximate vehicle of the plurality of proximate vehicles is based on an individual cost of the proximate vehicle and a joint cost of the proximate vehicle relative to the roadway vehicles. The method further includes generating a global objective function based on a summation of the total cost of the plurality of proximate vehicles. The method yet further includes determining a swarm action for a swarm vehicle of the swarm by minimizing the total cost of the global objective function. The method includes causing the swarm vehicle to execute the swarm action.

BRIEF DESCRIPTION OF THE DRAWINGS

FIG. 4 is an exemplary process flow for swarm adaptation based on social value orientations, according to one aspect.

FIG. 5 is another exemplary process flow for swarm adaptation based on social value orientations, according to one aspect.

DETAILED DESCRIPTION

Figure 1A:
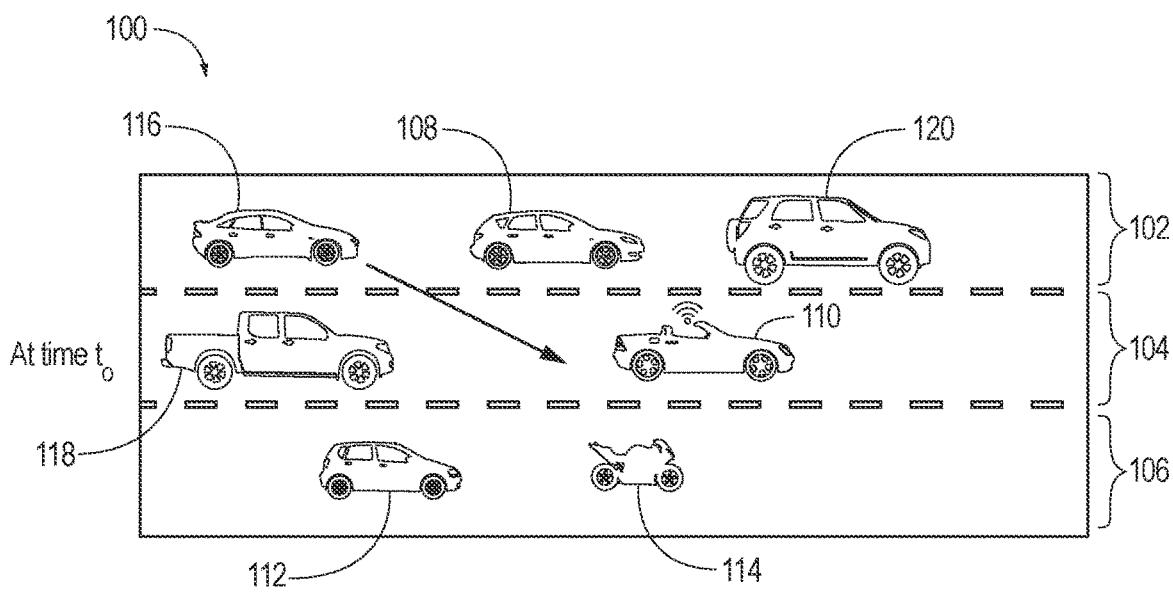
FIG. 1A is a schematic diagram of an exemplary traffic scenario on a roadway at a first time, according to one embodiment.

Roadway vehicles may exhibit some level of autonomy, such that, to some degree, the roadway vehicles may be controlled without intervention from a vehicle occupant. The roadway vehicles may control themselves according to a goal and/or may control each other to execute actions on a roadway. The roadway vehicles may include swarm vehicles of a swarm that act collectively based on an instantaneous traffic scenario and a shared goal of the swarm. The roadway vehicles may also include proximate vehicles that have individual goals. Therefore, while the proximate vehicle may act to achieve an individual goal specific to that proximate vehicle, the swarm vehicles act autonomously to achieve a shared goal of the swarm. However, the effectiveness of the swarm vehicles' actions is based on the behavior of proximate vehicles that are not participating in the swarm but are also traveling on the roadway.

The systems and methods provided herein analyze the behavior of the proximate vehicles to determine the actions of the swam vehicles or predict the behavior of proximate vehicles. For example, the behavior of the proximate vehicles may be analyzed to determine the behavior of the proximate vehicles as having social value orientations that are either egotistic or altruistic. An egotistic vehicle, having an egotistical social value orientation, may only act to advance the goals of that egotistic vehicle. For example, if the goal of the egotistic vehicle is to reach a destination in the shortest amount of time possible, the egotistic vehicle may not slow down to allow another vehicle to merge. An altruistic vehicle, having an altruistic social value orientation, may act to benefit traffic as a whole. For example, an altruistic vehicle may allow another vehicle to merge or pass.

The behavior of the proximate vehicles is classified to determine how the swarm vehicles should act. For example, if the proximate vehicles are acting egoistically, the general flow of all of the traffic on the roadway may be best served by operating the swarm in an altruistic manner because if both the swarm vehicles and the proximate vehicles are acting egotistically, a traffic jam may be more likely to occur. Conversely, if the proximate vehicles are acting altruistically, traffic flow of this section of the roadway may be benefited by having the swarm vehicles act egoistically.

Additionally, the systems and methods described herein may predict the state and input control of the proximate vehicles based on the social value orientation of the proximate vehicles. For example, it may be predicted that a proximate vehicle will yield or allow another vehicle to merge if the proximate vehicle has an altruistic social value orientation. Accordingly, the systems and methods described herein improve overall traffic flow by controlling swarm vehicles based on the social value orientations of the proximate vehicles also traveling the roadway.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein is a self-propelled machine that moves through or manipulates an environment. Exemplary agents may include, but is not limited to, robots, vehicles, or other self-propelled machines. The agent may be autonomously or semi-autonomously operated.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax™, Bluetooth™, Zigbee™, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

"Vehicle display," as used herein may include, but is not limited to, LED display panels, LCD display panels, CRT display, plasma display panels, touch screen displays, among others, that are often found in vehicles to display information about the vehicle. The display may receive input (e.g., touch input, keyboard input, input from various other input devices, etc.) from a user. The display may be located in various locations of the vehicle, for example, on the dashboard or center console. In some embodiments, the display is part of a portable device (e.g., in possession or associated with a vehicle occupant), a navigation system, an infotainment system, among others.

"Vehicle occupant," as used herein may include, but is not limited to, one or more biological beings located in the vehicle. The vehicle occupant may be a driver or a passenger of the vehicle. The vehicle occupant may be a human (e.g., an adult, a child, an infant) or an animal (e.g., a pet, a dog, a cat).

A "vehicle system", as used herein, may be any automatic or manual systems that may be used to enhance vehicle operation, driving, and/or operation. Exemplary vehicle systems include an autonomous driving system, an electronic stability control system, an anti-lock brake system, a brake assist system, an automatic brake prefill system, a low speed follow system, a cruise control system, a warning system, a braking system, an auto cruise control system, a lane departure warning system, a blind spot indicator system, a lane keep assist system, a navigation system, a transmission system, brake pedal systems, an electronic power steering system, visual devices (e.g., camera and imaging systems), a climate control system, an electronic pretensioning system, a monitoring system, a passenger detection system, a vehicle suspension system, a vehicle seat configuration system, a vehicle cabin lighting system, an audio system, a sensory system, among others.

I. System Overview

Figure 1B:
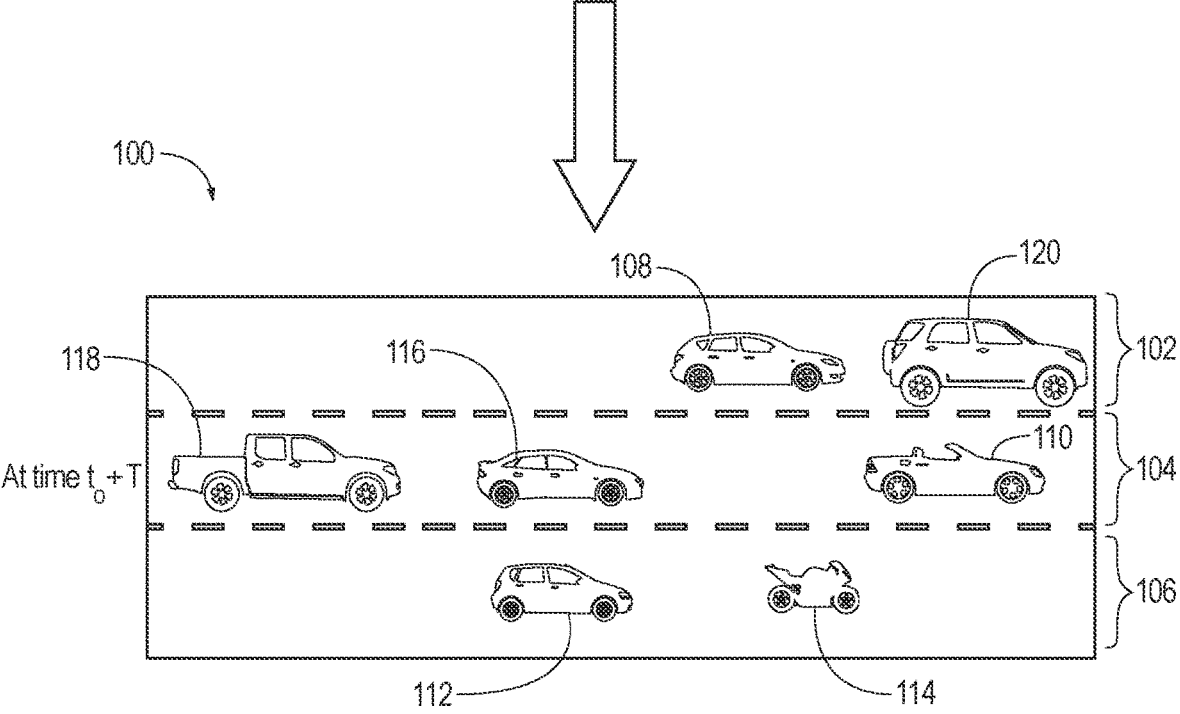
FIG. 1B is a schematic diagram of an exemplary traffic scenario on a roadway at a second time, later than the first time, according to one embodiment.

FIGS. 1A and 1B are exemplary traffic scenario on a roadway 100 that will be used to describe swarm invitation based on social value orientations according to one embodiment. The roadway 100 may be any type of road, highway, freeway, or travel route. In FIGS. 1A and 1B, the roadway 100 includes a first lane 102, a second lane 104, and a third lane 106 with vehicles traveling in the same longitudinal direction, however, the roadway 100 may have various configurations not shown and may have any number of lanes.

The roadway 100 includes a plurality of roadway vehicles 108-120. The plurality of roadway vehicles may be classified based on their membership in the swarm and/or autonomy capability. FIG. 1A is a snapshot of the roadway 100 at a first time step and FIG. 1B is a snapshot of the roadway 100 at a second time step that is later than the first time step. The classification of one or more roadway vehicles as swarm vehicles may change in time based on their current relationship with the swarm.

In FIG. 1A, a swarm includes swarm vehicles 108, 110, 112, 114, and 116. The swarm vehicles 108-116 exhibit some level of autonomy, such as parking assist or adaptive cruise control, and are able to engage in computer communication with other vehicles. One or more of the swarm vehicles 108-116 may be a host vehicle 200, shown in greater detail in FIG. 2. The host vehicle 200 accesses an operating environment 300, either directly or remotely, to a vehicle computing device (VCD) 302 that will be described in further detail with respect to FIG. 3. The swarm vehicles 108-116 may have the same or varying levels of autonomy. The levels of autonomy describe a swarm vehicle's ability to sense its surroundings and navigate trajectories without human intervention. In some embodiments, the levels may be defined by specific features or capabilities that a swarm vehicle may have, such as a swarm vehicle's ability to plan a path.

Proximate vehicles 118 and 120 are also traveling the roadway at the first time in the same longitudinal direction as the swarm vehicles 108-116. The proximate vehicles 118, 120 may be classic vehicles or autonomous vehicles. Classic vehicles are vehicles without sensing capability or decision-making ability. For example, a classic vehicle may have a null autonomy level such that that the vehicle has only the most basic sensing ability, such as environmental temperature, and no decision-making ability.

Figure 2:
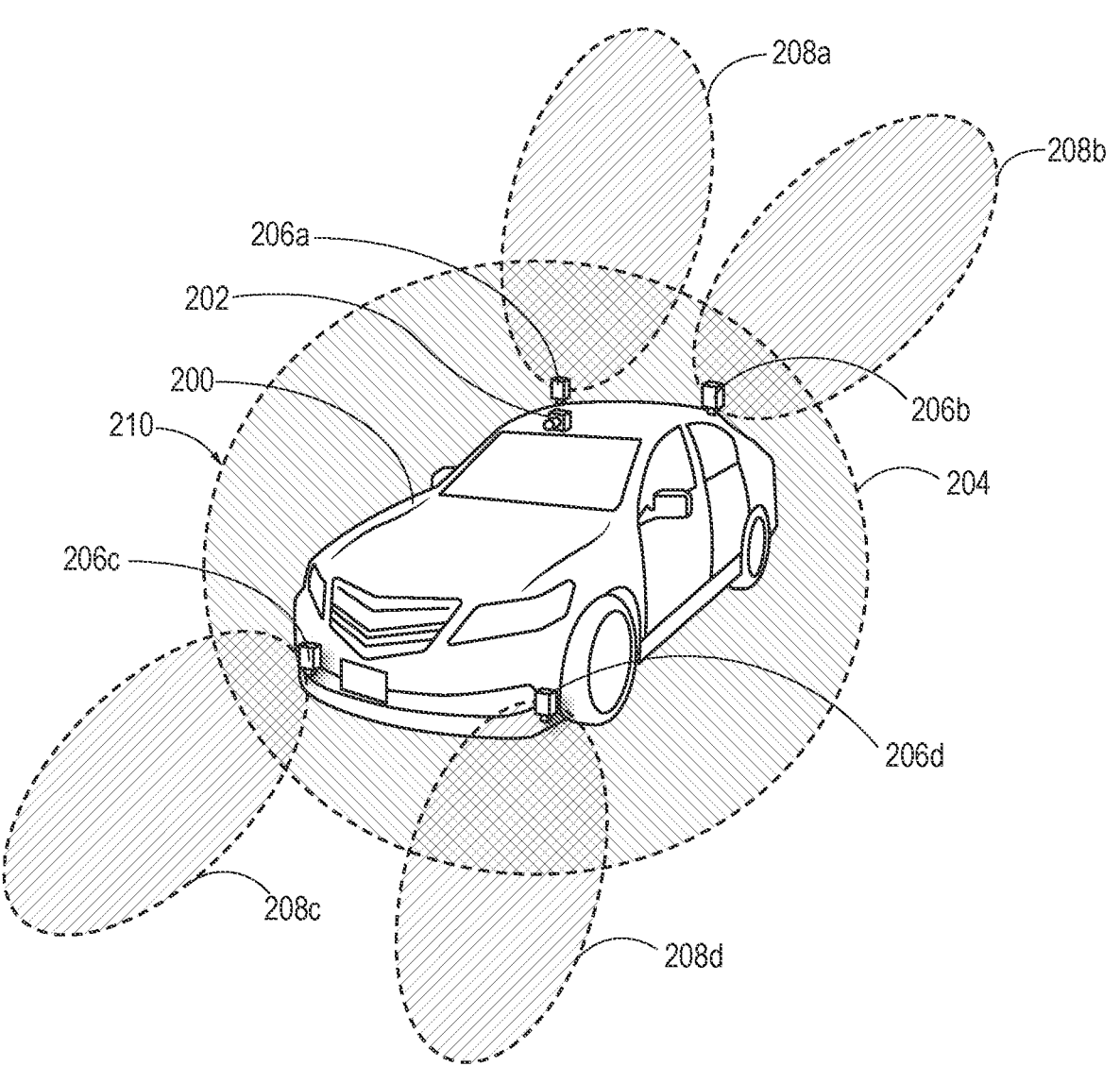
FIG. 2 is a schematic view of an exemplary sensor map of a host vehicle, according to one embodiment.

The swarm vehicles 108-116 may include at least one sensor for sensing objects and the surrounding environment of the roadway 100, as shown with respect to the host vehicle 200 of FIG. 2. The host vehicle 200 may represent an individual swarm vehicle of the swarm, a potential member of the swarm, or be centralized for the swarm as a whole. Accordingly, any or all of the swarm vehicles 108-116 is able to act as the host vehicle 200. The surrounding environment may be defined as a predetermined area located around (e.g., ahead, to the side of, behind, above, below) a host vehicle 200.

Turning to FIG. 2, the at least one sensor may include a light sensor 202 for capturing sensor data in a light sensing area 204 and one or more image sensors 206a, 206b, 206c, and 206d for capturing sensor data in corresponding image sensing areas 208a, 208b, 208c, and 208d which collectively form a sensor map 210. The sensor map 210 shown in FIG. 2 is based on one configuration of sensors including the light sensor 202 and the one or more image sensors 206a, 206b, 206c, and 206d. However, the sensor map 210 may have various configurations not shown in FIG. 2 based on the presence, position, acuity, etc. of the vehicle sensors of the host vehicle 200. Furthermore, the sensor data may additionally be received from remote sources. For example, the swarm vehicle 108 may receive sensor data from the swarm vehicle 110. Accordingly, the swarm vehicles 108-116 send and receive sensor data.

The light sensor 202 may be used to capture light data in the light sensing area 204. The size of the light sensing area 204 may be defined by the location, range, sensitivity, and/or actuation of the light sensor 202. For example, the light sensor 202 may rotate 360 degrees around the host vehicle 200 and collect sensor data from the light sensing area 204 in sweeps. Conversely, the light sensor 202 may be omni-directional and collect sensor data from all directions of the light sensing area 204 simultaneously. For example, the light sensor 202 may emit one or more laser beams of ultraviolet, visible, or near infrared light in the light sensing area 204 to collect sensor data.

The light sensor 202 may be configured to receive one or more reflected laser waves (e.g., signals) that are reflected off one or more objects in the light sensing area 204. In other words, upon transmitting the one or more laser through the light sensing area 204, the one or more laser beams may be reflected as laser waves by one or more traffic related objects (e.g., vehicles, pedestrians, trees, guardrails, etc.) that are located within the light sensing area 204.

The one or more image sensors 206a, 206b, 206c, and 206d may also be positioned around the host vehicle 200 to capture additional sensor data from the corresponding image sensing areas 208a, 208b, 208c, and 208d. The size of the image sensing areas 208a-208d may be defined by the location, range, sensitivity and/or actuation of the one or more image sensors 206a-206d.

The one or more image sensors 206a-206d may be disposed at external front and/or side portions of the host vehicle 200, including, but not limited to different portions of the vehicle bumper, vehicle front lighting units, vehicle fenders, and the windshield. The one or more image sensors 206a-206d may be positioned on a planar sweep pedestal (not shown) that allows the one or more image sensors 206a-206d to capture images of the external environment of the host vehicle 200 at various angles. Additionally, the one or more image sensors 206a-206d may be disposed at internal portions of the host vehicle 200 including the vehicle dashboard (e.g., dash mounted camera), rear side of a vehicle rear view mirror, etc.

Figure 3:
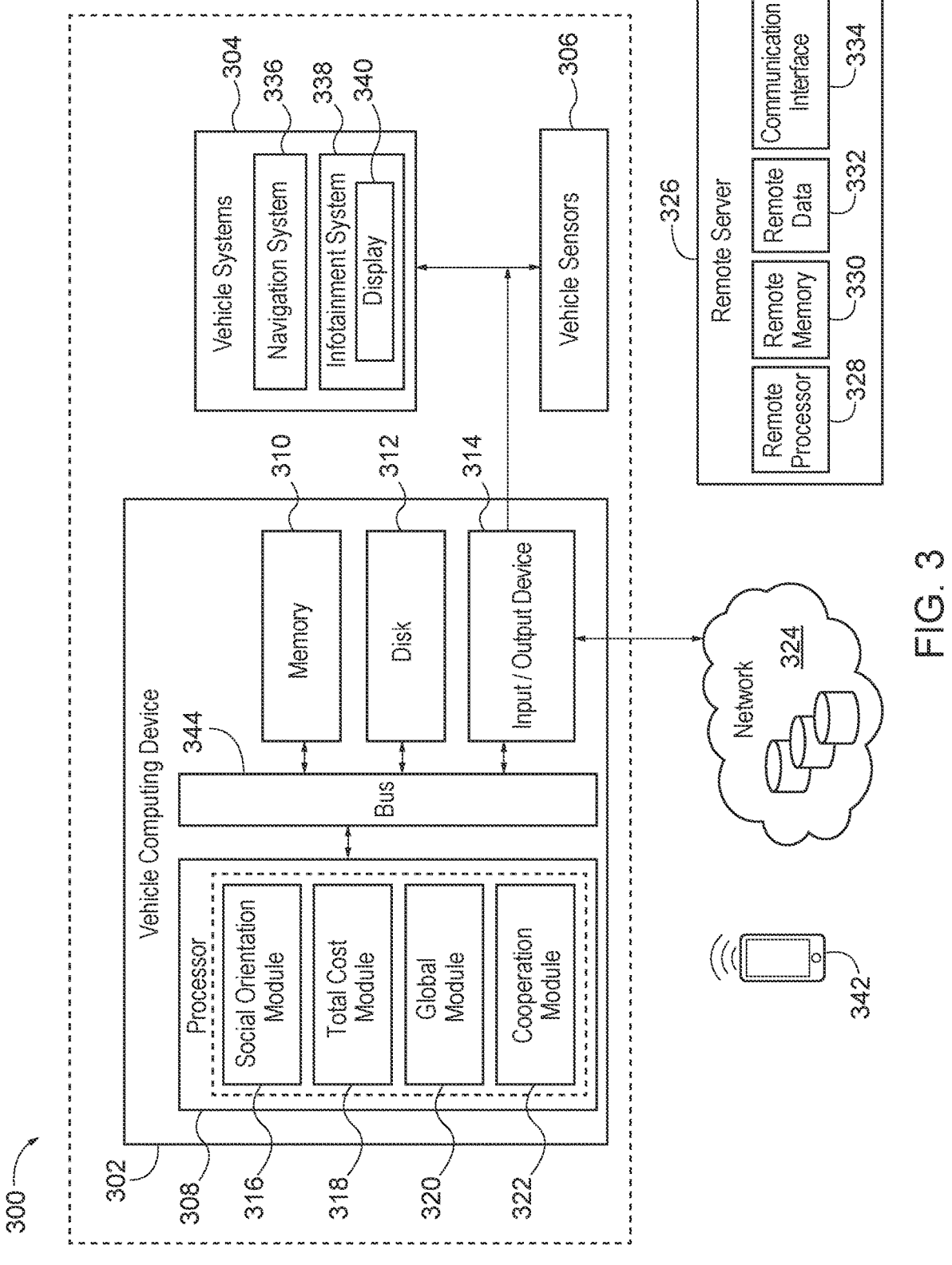
FIG. 3 is a block diagram of an operating environment for swarm adaptation based on social value orientations, according to an exemplary embodiment.

FIG. 3 is a block diagram of the operating environment 300 for implementing swarm invitation based on social value orientations according to an exemplary embodiment. For clarity, the operating environment 300 will be described with respect to the host vehicle 200 which may represent an individual swarm vehicle of the swarm, a potential member of the swarm or be centralized for the swarm as a whole. Accordingly, as discussed above, any or all of the swarm vehicles 108-116 is able to act as the host vehicle 200 with respect to the operating environment 300 shown in FIG. 3.

In FIG. 3, the host vehicle 200 includes the VCD 302, vehicle systems 304, and vehicle sensors 306. Generally, the VCD 302 includes a processor 308, a memory 310, a disk 312, and an input/output (I/O) device 314, which are each operably connected for computer communication via a bus 344 and/or other wired and wireless technologies defined herein. The VCD 302 includes provisions for processing, communicating, and interacting with various components of the host vehicle 200. In one embodiment, the VCD 302 may be implemented with the host vehicle 200, for example, as part of a telematics unit, a head unit, an infotainment unit, an electronic control unit, an on-board unit, or as part of a specific vehicle control system, among others. In other embodiments, the VCD 302 may be implemented remotely from the host vehicle 200, for example, with a remote transceiver (not shown), a portable device 342, or a remote server 326 connected via the network 324.

The processor 308 may include logic circuitry with hardware, firmware, and software architecture frameworks for facilitating swarm control of the host vehicle 200. The processor 308 may store application frameworks, kernels, libraries, drivers, application program interfaces, among others, to execute and control hardware and functions discussed herein. For example, the processor 308 may include a social orientation module 316, a total cost module 318, a global module 320, and a cooperation module 322, although the processor 308 may be configured into other architectures. Further, in some embodiments, the memory 310 and/or the disk 312 may store similar components for execution by the processor 308.

The social orientation module 316, the total cost module 318, the global module 320, and the cooperation module 322 may be artificial neural networks that act as a framework for machine learning, including reinforcement learning. For example, the social orientation module 316, the total cost module 318, the global module 320, and/or the cooperation module 322 may be a convolution neural network (CNN). In one embodiment, social orientation module 316, the total cost module 318, the global module 320, and/or the cooperation module 322 may include a conditional generative adversarial network (cGAN), multi-space graph neural network (MS-GNN) and/or a graph-based conditional variational recurrent neural network (GC-VRNN).

The I/O device 314 may include software and hardware to facilitate data input and output between the components of the VCD 302 and other components of the operating environment 300. Specifically, the I/O device 314 may include network interface controllers (not shown) and other hardware and software that manages and/or monitors connections and controls bi-directional data transfer between the 1/O device 314 and other components of the operating environment 300 using, for example, the network 324.

In some embodiments, cooperating vehicles may communicate via a transceiver (not shown). The transceiver may be a radio frequency (RF) transceiver may be used to receive and transmit information to and from a remote server. In some embodiments, the VCD 302 may receive and transmit information to and from the remote server 326 as remote data 332 including, but not limited to, vehicle data, traffic data, road data, curb data, vehicle location and heading data, high-traffic event schedules, weather data, or other transport related data. In some embodiments, the remote server 326 may be linked to multiple roadway vehicles 108-120, other entities, traffic infrastructures, and/or devices through a network connection, such as via the wireless network antenna, the roadside equipment, and/or other network connections.

Referring again to the host vehicle 200, the vehicle systems 304 may include any type of vehicle control system described herein to enhance the host vehicle 200 and/or driving of the host vehicle 200. For example, the vehicle systems 304 may include autonomous driving systems, driver-assist systems, adaptive cruise control systems, lane departure warning systems, merge assist systems, freeway merging, exiting, and lane-change systems, warning systems, integrated vehicle-based systems, and automatic guided vehicle systems, or any other advanced driving assistance systems (ADAS). Here, the vehicle systems 304 include a navigation system 336 and an infotainment system 338. The navigation system 336 may store, calculate, and provides route and destination information and facilitate features like turn-by-turn directions. The infotainment system 338 provides visual information and/or entertainment to the vehicle occupant and may include a display 340.

The vehicle sensors 306, which may be implemented with the vehicle systems 304, may include various types of sensors for use with the host vehicle 200 and/or the vehicle systems 304 for detecting and/or sensing a parameter of the host vehicle 200, the vehicle systems 304, and/or the environment surrounding the host vehicle 200. For example, the vehicle sensors 306 may provide data about vehicles and/or downstream objects in proximity to the host vehicle 200. For example, the vehicle sensors 306 may include, but are not limited to: acceleration sensors, speed sensors, braking sensors, proximity sensors, vision sensors, ranging sensors, seat sensors, seat-belt sensors, door sensors, environmental sensors, yaw rate sensors, steering sensors, GPS sensors, among others. The vehicle sensors 306 may be any type of sensor, for example, acoustic, electric, environmental, optical, imaging, light, pressure, force, thermal, temperature, proximity, among others.

Using the system and network configuration discussed above, the swarm vehicles 108-116 may adapt their actions based on the social value orientations of vehicle 118, 120 also traveling the roadway 100. Detailed embodiments describing exemplary methods using the system and network configuration discussed above, will now be discussed in detail.

II. Methods for Swarm Adaptation Based on Social Value Orientations

Referring now to FIG. 4, a method 400 for swarm adaptation based on social value orientations will now be described according to an exemplary embodiment. FIG. 4 will also be described with reference to FIGS. 1-3, 5, and 6. For simplicity, the method 400 will be described as a sequence of blocks, but it is understood that the elements of the method 400 may be organized into different architectures, elements, stages, and/or processes.

At block 402, the method 400 includes the social orientation module 316 calculating social value orientations for one or more proximate vehicles of a plurality of proximate vehicles on a roadway 100 with a plurality of swarm vehicles of a swarm on the roadway 100. The proximate vehicles 118, 120 of the plurality of proximate vehicles and the swarm vehicles 108-116 of the swarm are roadway vehicles 108-120 traveling in the same longitudinal direction on the roadway 100.

In some embodiments, the social orientation module 316 may calculate social value orientations based on learning human reward functions through Inverse Reinforcement Learning (IRL). The social orientation module 316 enables social compliance by learning human reward functions through IRL. The social value orientations are based on an intrinsic understanding of human behavior as well as the social expectations of the roadway vehicles 108-120. Human behavior may be imitated by learning human policies from data through Imitation Learning.

For example, an optimal control policy of the best response game with learned rewards yields a human-imitating policy. Mathematically, the imitating policy is the expectation of human behavior based on past observed actions at previous time steps, capable of predicting and mimicking human trajectories. The social value orientations enable the systems and methods herein to control a swarm vehicle or predict a maneuver of proximate vehicle based on the expected manner that a human would behave in traffic scenarios, such as acting more competitively during merges, and mirroring the utility-maximization strategies of humans with heterogeneous social preferences in social dilemmas.

Translating this decision-making into an optimization framework for socially-compliant behavior, a utility-maximizing policy may be given by:

$$u_i^*(x^0, \varphi_i) = \arg\max_{u_i} G_i(x^0, u_i, u_{\to i}, \varphi_i)$$

In one example, the social orientation module 316 may use a maximum entropy model, given by:

$$P(u_i \mid x^0, u_{\to i}, \varphi_i)\partial \exp(G_i(x^0, u_i, u_{\to i}, \varphi_i))$$

The maximum entropy model may be used to learn rewards by IRL. Under this model, the probability of actions u is proportional to the exponential of the utility encountered along the trajectory. Hence, utility-maximization may yield actions most likely imitating human driver behavior, which may increase for social compliance.

The social orientation module 316 may determine a proximate social value orientation of the proximate vehicle 118. The social orientation module 316 may determine the proximate social value orientation of the proximate vehicle 118 based on a single iteration at a first time step based on previous time steps. In another embodiment, the social orientation module 316 may determine the proximate social value orientation of the proximate vehicle 118 based on multiple iterations. For example, over a number of time steps for a predetermined number of previous time steps that define a time horizon. Accordingly, a plurality of social value orientations may be determined for a vehicle at a number of time steps in the time horizon.

The proximate social value orientation is calculated to result in a binary allocation of the proximate vehicle 118 as exhibiting either an egotistic social value orientation or altruistic social value orientation based on the IRL. In one embodiment, the social value orientation may be a radial angle calculated based on the behavior of the roadway vehicles 108-120 at the previous time steps. For example, the social value orientation may be given as φ. In one embodiment, the social value orientation φ may be determined to be $$\varphi = \frac{\pi}{2} \text{ or } \varphi = \pi.$$

As discussed above, the calculations may be iterative. Accordingly, the social orientation module 316 may determine a first proximate social value orientation at the second time. In a next iteration, the behavior of the proximate vehicle 118 may change. Consequently, the social orientation module 316 may determine a second proximate social value orientation that is different than the first proximate social value orientation. In some embodiments, the proximate vehicle 118 may need to have the same social value orientation over a predetermined number of iterations for the social orientation module 316 to determine a proximate social value orientation.

At block 404, the method 400 includes the total cost module 318 determining a total cost for the one or more proximate vehicles based on the social value orientations. In particular, using the proximate social value orientation, the total cost of a roadway vehicles 108-120 may be determined based on an individual cost and a joint cost. For example, the total cost for the proximate vehicle 118 is based on an individual cost of the proximate vehicle 118 and a joint cost of the proximate vehicle 118 relative to the other roadway vehicles 108-116 and 120. The individual cost is based on a state $x_i$ of the proximate vehicle and an action $u_i$ of the proximate vehicle 118. The joint cost is based on a stacked state $$x_{\bar{i}}$$

of the other roadway vehicles 108-116 and 120 and a stacked action $$u_{\bar{i}}$$

of the other roadway vehicles 108-116 and 120. Therefore, the total cost $J_i$ of a roadway vehicle, here the proximate vehicle 118, is partitioned into its individual cost incurred from its own state and action given by $c_i(x_i, u_i)$ and the joint cost that the proximate vehicle 118 incurs based on other the other roadway vehicles 108-116 and 120 due to the joint state and action given by $$c_i^{joint}(x_i, u_i, x_{\bar{i}}, u_{\bar{i}}).$$

The relation may be given by:

$$J_i = \cos\varphi_i \cdot c_i(x_i, u_i) + \sin\varphi_i \cdot c_i^{joint}(x_i, u_i, x_{\bar{i}}, u_{\bar{i}})$$

At block 406, the method 400 includes the global module 320 generating a global objective function based on a summation of the total cost of the plurality of proximate vehicles. The global objective function defines the global cost for each of the roadway vehicles 108-120. Therefore, the global objective function is formed for the each of the swarm vehicles 108-116 defined by the set, $i \in S$, and also for each of the proximate vehicles 118, 120 defined by the set, $j \in O$. Accordingly, the global objective function defines a current traffic scenario in the form:

$$J_{Local} = \sum_{i \in S}\left(\cos\varphi_i \cdot c_i(x_i, u_i) + \sin\varphi_i \cdot c_i^{joint}(x_i, u_i, x_{\bar{i}}, u_{\bar{i}})\right) +$$
$$\sum_{j \in O}\left(\cos\varphi_j \cdot c_j(x_j, u_j) + \sin\varphi_j \cdot c_j^{joint}(x_j, u_j, x_{\bar{j}}, u_{\bar{j}})\right)$$

At block 408, the method 400 includes determining a swarm action for a swarm vehicle of the swarm by minimizing the total cost of the global objective function. In particular, the global objective function is solved as an optimization in a distributed manner by the swarm vehicles 108-116. The total cost of the global objective function is minimized in order to determine $(x_i, u_i)$ for the swarm vehicles 108-116. In this manner, the actions of the swarm vehicles 108-116 may be controlled such that the swarm vehicles 108-116 adapt to the social value orientation of the proximate vehicles 118, 120. For example, in a region where aggressive driving is typical and the proximate vehicles 118, 120 have an egotistical social value orientation, the general flow of all of the traffic on the roadway 100 may be best served by operating the swarm in an altruistic manner because if both the swarm vehicles 108-116 and the proximate vehicles 118,120 are acting egotistically, a traffic jam may be more likely to occur. Thus, in such a scenario, minimizing the global objective function causes the action $u_i$ of the swarm vehicles 108-116 to comport with an altruistic social value orientation. Conversely, if the proximate vehicles 118,120 are acting altruistically, traffic flow of the roadway 100 may be benefited by having the swarm vehicles 108-116 act egotistically. Accordingly, in such a scenario, minimizing the global objective function causes the action $u_i$ of the swarm vehicles 108-116 to comport with an egotistic social value orientation. Therefore, the swarm vehicles 108-116 are able to adapt to a social value orientation that compliments the proximate social value orientation of the proximate vehicles 118, 120. By adapting their social value orientation and corresponding actions, the swarm vehicles 108-116 facilitate traffic traversing the roadway 100 more efficiently.

At block 410, the method 400 includes causing the swarm vehicle 116 to execute the swarm action. The swarm action may include kinematic parameters for the swarm vehicle 116. Kinematic parameters define kinematic operation of the swarm vehicle 116. For example, the kinematic parameters may include a destination, preferred travel route, acceptance of routes with toll roads, desired average travel speed, maximum travel speed, minimum travel speed, and preferred lane, amongst others. For example, if the proximate vehicles are acting with an egotistic social value orientation, the kinematic parameters for the swarm vehicle 116 may include decreasing the speed of the swarm vehicle 116 to increase the gap length at a potential lane change location allowing the proximate vehicle 118 to merge.

The kinematic parameters may also include parameters for specific maneuvers. For example, a lane change maneuver may have specific kinematic parameters that describe the instances when a lane change would be deemed appropriate, such as when traveling at or near the minimum travel speed due to a preceding vehicle moving slowly, encountering an obstacle in the roadway, sensing an emergency vehicle, etc. The lane change maneuver may also be associated with kinematic parameters that describe the physical boundaries of the lane change, such as the desired gap length between a preceding vehicle (not shown) and a following vehicle (not shown) or the number of lanes that may be laterally traversed in a lane change maneuver. For example, swarm vehicles 108-116 controlled to act relatively altruistically may require a larger gap between two proximate vehicles in a target lane before the swarm vehicle will complete a lane change than swarm vehicles controlled to act relatively egotistically. In this manner, a swarm action may be executed by the swarm vehicle 116 to comport with the swarm social value orientation.

The swarm action may additionally or alternatively include relative parameters that describe the relationship between the swarm vehicles sharing autonomy. For example, the relative parameters may control the manner in which the swarm vehicles 108-116 adjust speed, velocity, yaw rate, steering angle, throttle angle, range or distance data, among others. For example, swarm vehicles controlled to act relatively altruistically may accelerate and decelerate at slower rates than swarm vehicles controlled to act relatively egotistically. Furthermore, swarm vehicles 108-116 controlled to act relatively altruistically may complete a lane change maneuver over a longer distance than swarm vehicles 108-116 controlled to act relatively egotistically. The relative parameters may also include status information about vehicle systems 304 such as turn signal status, course heading data, course history data, projected course data, kinematic data, current vehicle position data, and any other vehicle information about the subordinate vehicle. The relative parameters may also include parameters related to cooperative adaptive cruise control (C-ACC), intelligent cruise control systems, autonomous driving systems, driver-assist systems, lane departure warning systems, merge assist systems, freeway merging, exiting, and lane-change systems, warning systems, integrated vehicle-based systems, and automatic guided vehicle systems. Thus, the swarm vehicles 108-116 are controlled to execute swarm actions that minimize the total cost of the global objective function such that the swarm adapts to the social value orientations of the proximate vehicles 118, 120 on the roadway 100.

Referring now to FIG. 5, a method 500 for swarm adaptation based on social value orientations will now be described according to an exemplary embodiment. FIG. 5 will also be described with reference to FIGS. 1-4 and 6. For simplicity, the method 500 will be described as a sequence of blocks, but it is understood that the elements of the method 500 may be organized into different architectures, elements, stages, and/or processes. The method 500 includes a number of blocks previously described with respect to the method 400 and operate in a similar manner as described above.

At block 402, the method 500 includes the social orientation module 316 calculating social value orientations or one or more proximate vehicles of a plurality of proximate vehicles on a roadway 100 with a plurality of swarm vehicles of a swarm on the roadway 100. At block 404, the method 500 includes the total cost module 318 determining a total cost for the one or more proximate vehicles based on the social value orientations. At block 406, the method 500 includes the global module 320 generating a global objective function based on a summation of the total cost of the plurality of proximate vehicles.

At block 502, the method 500 includes determining a social behavior for a swarm vehicle or a proximate vehicle by minimizing the total cost of the global objective function. For example, the cooperation module 322 may determine a social behavior for a swarm vehicle based on previous time steps. Based on an analysis of the previous time steps over a time horizon and corresponding social value orientations for each of those time steps, the cooperation module 322 may determine that a calculated percentage of the time horizon, such as 80% of the time horizon, the swarm vehicle has an altruistic social behavior corresponding to the percentage of altruistic social value orientations to egotistical social value orientations in the time horizon. In this manner, if 80% of the social value orientations are altruistic social value orientations, the social behavior may be determined to be 80% altruistic.

At block 504, the method 500 includes the cooperation module 322 predicting a maneuver based on the social behavior. The cooperation module 322 may predict a trajectory of the swarm vehicle based on the social behavior of the swarm vehicle in previous iterations. Continuing the example from above, if the social behavior is determined to be 80% altruistic, then the cooperation module may predict a maneuver for the swarm vehicle that is altruistic. For example, the swarm vehicle may be more likely to yield in an intersection.

Figure 6:
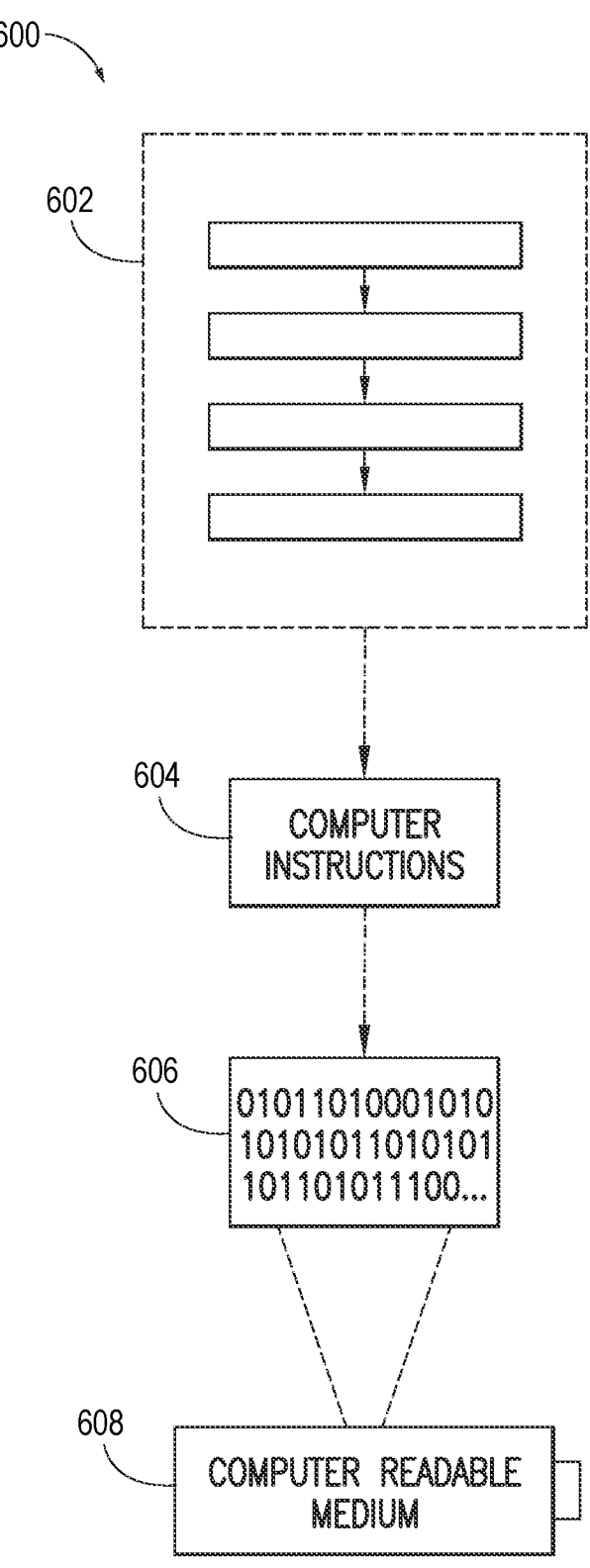
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 400 of FIG. 4 or the method 500 of FIG. 5. In another aspect, the processor-executable computer instructions 604 may be configured to implement a system, such as the operating environment 300 of FIG. 3. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for swarm adaptation based on social value orientations, comprising:

calculating social value orientations for each one of a plurality of non-swarm vehicles on a roadway with a plurality of swarm vehicles of a swarm on the roadway that act collectively based on an instantaneous traffic scenario and a shared goal of the swarm, wherein each one of the plurality of non-swarm vehicles and the swarm vehicles of the swarm are roadway vehicles traveling in the same longitudinal direction on the roadway, and the plurality of non-swarm vehicles are not participating the swarm;

determining a total cost for each one of the plurality of non-swarm vehicles based on the social value orientations, wherein the total cost for each one of the plurality of non-swarm vehicles is based on an individual cost of the corresponding non-swarm vehicle and a joint cost of the corresponding non-swarm vehicle relative to the roadway vehicles other than the corresponding non-swarm vehicle, the individual cost is based on a state of the corresponding non-swarm vehicle and an action of the corresponding non-swarm vehicle, and the joint cost is based on a stacked state of the roadway vehicles other than the corresponding non-swarm vehicle and a stacked action of the roadway vehicles other than the corresponding non-swarm vehicle;

generating a global objective function based on a summation of the total cost of the plurality of non-swarm vehicles;

determining a swarm action for a swarm vehicle of the swarm by minimizing the total cost of the global objective function; and causing the swarm vehicle to execute the swarm action.

2. The computer-implemented method of claim 1, wherein the social value orientations are calculated based on inverse reinforcement learning.

3. The computer-implemented method of claim 1, further comprising:

determining a social behavior for a swarm vehicle based on the global objective function.

4. The computer-implemented method of claim 1, wherein the social value orientation is a radial angle.

5. The computer-implemented method of claim 1, wherein the social value orientation calculated to result in a binary allocation of each one of the plurality of non-swarm vehicles as exhibiting an egotistic social value orientation or an altruistic social value orientation.

6. The computer-implemented method of claim 1, wherein the total cost for each one of the plurality of non-swarm vehicles is given by:

$$J_i = \cos \varphi_i \cdot c_i(x_i, u_i) + \sin\varphi_i \cdot c_i^{joint}(x_i, u_i, x_{\bar{i}}, u_{\bar{i}}),$$

where $J_i$ is the total cost, $\varphi_i$ is the social value orientation of the corresponding non-swarm vehicle, $c_i(x_i, u_i)$ is the individual cost, $x_i$ is the state of the corresponding non-swarm vehicle, $u_i$ is the action of the corresponding non-swarm vehicle, $$c_i^{joint}(x_i, u_i, x_{\bar{i}}, u_{\bar{i}})$$

is the joint cost, $$x_{\bar{i}}$$

is the stacked state of the roadway vehicles other than the corresponding non-swarm vehicle, and $$u_{\bar{i}}$$

is the stacked action of the roadway vehicles other than the corresponding non-swarm vehicle.

7. A non-transitory computer readable storage medium storing instructions that when executed by a computer having a processor to perform a method for swarm adaptation based on social value orientations, the method comprising:

calculating social value orientations for each one of a plurality of non-swarm vehicles on a roadway with a plurality of swarm vehicles of a swarm on the roadway that act collectively based on an instantaneous traffic scenario and a shared goal of the swarm, wherein each one of the plurality of non-swarm vehicles and the swarm vehicles of the swarm are roadway vehicles traveling in the same longitudinal direction on the roadway, and the plurality of non-swarm vehicles are not participating the swarm;

determining a total cost for each one of the plurality of non-swarm vehicles based on the social value orientations, wherein the total cost for each one of the plurality of non-swarm vehicles is based on an individual cost of the corresponding non-swarm vehicle and a joint cost of the corresponding non-swarm vehicle relative to the roadway vehicles other than the corresponding non-swarm vehicle, the individual cost is based on a state of the corresponding non-swarm vehicle and an action of the corresponding non-swarm vehicle, and the joint cost is based on a stacked state of the roadway vehicles other than the corresponding non-swarm vehicle and a stacked action of the roadway vehicles other than the corresponding non-swarm vehicle;

generating a global objective function based on a summation of the total cost of the plurality of non-swarm vehicles;

determining a swarm action for a swarm vehicle of the swarm by minimizing the total cost of the global objective function; and causing the swarm vehicle to execute the swarm action.

8. The non-transitory computer readable storage medium of claim 7, wherein the social value orientations are calculated based on inverse reinforcement learning.

9. The non-transitory computer readable storage medium of claim 7, further comprising:

determining a social behavior for a swarm vehicle based on the global objective function.

10. The non-transitory computer readable storage medium of claim 7, wherein the social value orientation is a radial angle.

11. The non-transitory computer readable storage medium of claim 7, wherein the social value orientation calculated to result in a binary allocation of each one of the plurality of non-swarm vehicles as exhibiting an egotistic social value orientation or an altruistic social value orientation.

12. The non-transitory computer readable storage medium of claim 7, wherein the total cost for each one of the plurality of non-swarm vehicles is given by:

$$J_i = \cos \varphi_i \cdot c_i(x_i, u_i) + \sin\varphi_i \cdot c_i^{joint}(x_i, u_i, x_{\bar{i}}, u_{\bar{i}}),$$

where $J_i$ is the total cost, $\varphi_i$ is the social value orientation of the corresponding non-swarm vehicle, $c_i(x_i, u_i)$ is the individual cost, $x_i$ is the state of the corresponding non-swarm vehicle, $u_i$ is the action of the corresponding non-swarm vehicle, $$c_i^{joint}(x_i, u_i, x_{\bar{i}}, u_{\bar{i}})$$

is the joint cost, $$x_{\bar{i}}$$

is the stacked state of the roadway vehicles other than the corresponding non-swarm vehicle, and $$u_{\bar{i}}$$

is the stacked action of the roadway vehicles other than the corresponding non-swarm vehicle.

13. A system for swarm adaptation based on social value orientations, comprising:

a processor; and a memory storing instructions that when executed by the processor cause the processor to:

calculate social value orientations for each one of a plurality of non-swarm vehicles on a roadway with a plurality of swarm vehicles of a swarm on the roadway that act collectively based on an instantaneous traffic scenario and a shared goal of the swarm, wherein each one of the plurality of non-swarm vehicles and the swarm vehicles of the swarm are roadway vehicles traveling in the same longitudinal direction on the roadway, and the plurality of non-swarm vehicles are not participating the swarm;

determine a total cost for each one of the plurality of non-swarm vehicles based on the social value orientations, wherein the total cost for each one of the plurality of non-swarm vehicles is based on an individual cost of the corresponding non-swarm vehicle and a joint cost of the corresponding non-swarm vehicle relative to the roadway vehicles other than the corresponding non-swarm vehicle, the individual cost is based on a state of the corresponding non-swarm vehicle and an action of the corresponding non-swarm vehicle, and the joint cost is based on a stacked state of the roadway vehicles other than the corresponding non-swarm vehicle and a stacked action of the roadway vehicles other than the corresponding non-swarm vehicle;

generate a global objective function based on a summation of the total cost of the plurality of non-swarm vehicles;

determine a swarm action for a swarm vehicle of the swarm by minimizing the total cost of the global objective function; and cause the swarm vehicle to execute the swarm action.

14. The system of claim 13, wherein the social value orientations are calculated based on inverse reinforcement learning.

15. The system of claim 13, further comprising:

determining a social behavior for a swarm vehicle based on the global objective function.

16. The system of claim 13, wherein the social value orientation is a radial angle.

17. The system of claim 13, wherein the social value orientation calculated to result in a binary allocation of each one of the plurality of non-swarm vehicles as exhibiting an egotistic social value orientation or an altruistic social value orientation.

18. The system of claim 13, wherein the total cost for each one of the plurality of non-swarm vehicles is given by:

$$J_i = \cos \varphi_i \cdot c_i(x_i, u_i) + \sin\varphi_i \cdot c_i^{joint}(x_i, u_i, x_{\bar{i}}, u_{\bar{i}}),$$

where $J_i$ is the total cost, $\varphi_i$ is the social value orientation of the corresponding non-swarm vehicle, $c_i(x_i, u_i)$ is the individual cost, $x_i$ is the state of the corresponding non-swarm vehicle, $u_i$ is the action of the corresponding non-swarm vehicle, $$c_i^{joint}(x_i, u_i, x_{\bar{i}}, u_{\bar{i}})$$

is the joint cost, $$x_{\bar{i}}$$

is the stacked state of the roadway vehicles other than the corresponding non-swarm vehicle, and $$u_{\bar{i}}$$

is the stacked action of the roadway vehicles other than the corresponding non-swarm vehicle.

* * * * *